UNITED STATES PATENT OFFICE.

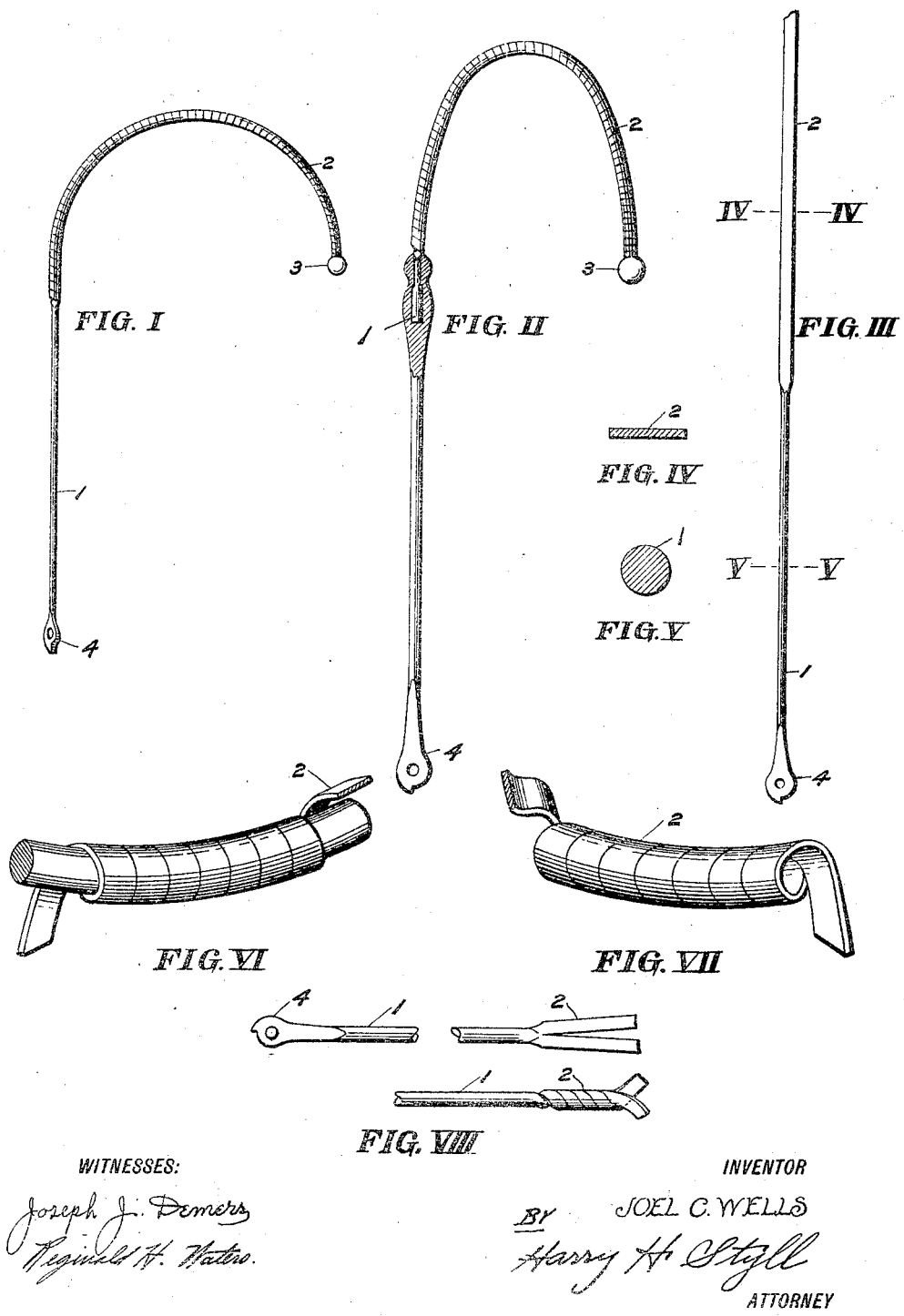

JOEL C. WELLS, OF SOUTHBRIDGE, MASSACHUSETTS.

SPECTACLES.

1,036,530.

Specification of Letters Patent. Patented Aug. 20, 1912.

Application filed May 10, 1911. Serial No. 626,235.

*To all whom it may concern:*

Be it known that I, JOEL C. WELLS, a citizen of the United States, residing at Southbridge, in the county of Worcester and State of Massachusetts, have invented certain new and useful Improvements in Spectacles, of which the following is a specification.

My invention relates to improvements in spectacles and has for its object to provide an improved construction of flexible temple.

My invention comprises a temple side having a portion thereof coiled in the form of a flat helix.

The principal object of my invention is to provide a temple having minimum weight with maximum elasticity and bearing surface.

Another object of my invention is to eliminate the difficulty usually found in the manufacture of helical temples of attaching the coiled portion to the temple.

Another object of my invention is to provide a flexible temple, the convolutions of which will present a smooth continuous surface instead of the corrugated surface usual with such temples.

Another object of my invention is to simplify and cheapen the construction of flexible temples.

Another object of my invention is to provide a flexible temple of large bearing surface which may be manufactured from a single piece of stock.

With these and other objects in view, the invention consists in the novel construction and arrangement of parts hereinafter described, delineated in the drawings and specifically claimed, it being understood that changes properly falling within the scope of what is claimed may be made without departing from the spirit of my invention.

Similar numerals of reference are employed to denote corresponding parts throughout the several figures of my drawing.

Figure I is a perspective view of a temple involving my invention. Fig. II is a view similar to Fig. I showing a modification showing wherein the flexible ear hook is attached to the side, the point of attachment being shown in section. Fig. III shows a temple blank, a portion thereof having been reduced for, but not yet coiled into the cable portion. Fig. IV is a section on line IV—IV, Fig. III. Fig. V is a section on line V—V, Fig. III. Fig. VI shows a portion of the cable end coiled around a core. Fig. VII shows a portion of the cable end coiled without the use of a core. Fig. VIII shows in two views portions of a split ended blank, one view shows the flexible end split, and the other shows these split ends coiled.

Referring specifically to the drawings: the stock or body 1, from which the temple is constructed is reduced or flattened through a portion 2, Figs. III and IV. This reduced section is then coiled into the form of a helix as shown in Figs. VI and VII and the end finished off with a knob or ball 3 as shown in Figs. I and II. The opposite end of the stock is reduced to form the ear hook 4, Figs. I, II and III, which is adapted to form a part of the usual hinged joint attached to the lens strap of a pair of spectacles. If desired the reduced portion 2 of the temple blank may be split as shown in Fig. VIII and the strands, so formed, twisted into a cable. In Fig. VIII only two strands are shown but more could be provided if desired and a multiple cable produced.

I have shown a temple end or ear hook constructed of flat material or of a flattened reduced cross section and it will be seen that a helix formed with material having such a cross section possesses many advantages. A greater bearing surface is provided with minimum increase of weight; this insures comfort to the wearer, reducing the tendency of the temples to cut into the flesh. Being coiled into a helix, flexibility is obtained, whereby the temple is allowed to adjust itself to the wearer. The material being flat, insures a smooth bearing surface free from the corrugations usual with helical temples made of rounded stock and consequently produces a surface less liable to irritate the skin. Still another advantage lies in the fact that these advantages are obtained while at the same time the weight of the temple has been reduced from that usual in flexible temples made of stock of rounded cross section. The flat helix may be wound on a core or not, depending upon the amount of rigidity desired. If stiffness is desired a core may be inserted in the coil of the helix, as shown in Fig. VI.

The entire temple may be made of one piece, one end being reduced and coiled, as shown in Fig. I, or the helix may be made separate and swaged within the temple side, as shown in Fig. II.

I am aware that prior to my invention comfort or cable temples have been made either by winding a coil or helix of rounded cross section around the usual straight temple as a core, or by winding several strands of rounded stock one over the other on the temple as a core, but such temples are heavy and corrugated and difficulty has been experienced with these constructions in trying to properly secure the ends of the coils in place on the temple. I accordingly do not claim such a construction but I do not believe that prior to my invention temples have been made of flattened stock or integrally with the side wires as described herein. The use of a ball or tip on the end of spectacles is also old and I do not claim the use of same as a part of this invention.

It is to be noted that the cross section of the cable portion may be reduced to practically any thickness or weight and also that with flat stock a coil can be constructed without reducing the side by merely coiling the outer end in the form of a helix and tipping off the end with the usual ball. When in place on the wearer these coils which are larger in cross section than the usual side wire and which are also more flexible than the side wires, produce a comfortable bearing surface which is continuous and not so liable to cut the ear and irritate the wearer.

In a construction such as I have described, it will be seen that the trouble of securing the free ends of the cable coil has been eliminated; a smooth flexible bearing surface has been provided; a neat and finished appearance maintained; the cost of production reduced, and minimum weight maintained.

Various methods of arranging and placing the coils may be devised without departing from the spirit of my invention. I, therefore, do not desire to be limited to the exact details shown.

Having thus described my invention, the following is what I claim as new therein and desire to secure by Letters Patent:

1. A spectacle temple including a side portion and an ear hook formed from a flattened piece of material wound in a hollow smooth helix adapted to present a large bearing surface while of light weight and great flexibility.

2. A blank for a spectacle temple comprising a side portion and a flattened terminal portion adapted to be wound into a hollow spiral to form an ear hook.

3. A spectacle temple comprising a side portion of circular shape in cross section terminating in an integral flattened portion wound to form a tubular ear hook, the edges of the flat material being in close engagement with each other whereby the ear hook is of minimum weight and presents a wide smooth bearing surface to the ear of the wearer.

4. A temple for spectacles comprising a body portion, and an integral coiled section, the material forming the coiled portion being flat so that the convolutions thereof produce a smooth surface.

In testimony whereof, I affix my signature in presence of two witnesses.

JOEL C. WELLS.

Witnesses:
PAUL T. TRUEMAN,
HARRY H. STYLL.